June 23, 1942.  D. D. RAZE  2,287,325

INTERNAL COMBUSTION ENGINE

Filed Oct. 28, 1938

Inventor
Douglas D. Raze
By Williamson & Williamson
Attorneys

Patented June 23, 1942

2,287,325

UNITED STATES PATENT OFFICE 2,287,325

INTERNAL COMBUSTION ENGINE

Douglas D. Raze, Robbinsdale, Minn.

Application October 28, 1938, Serial No. 237,500

3 Claims. (Cl. 123—119)

This invention relates to internal combustion engines and is particularly adapted for use in automobile engines although not limited to such application.

When the piston rings of an internal combustion engine or the cylinder walls thereof become worn, a common result is the pumping of oil from the crank case up past the piston rings into the upper portion of the cylinder and the combustion chamber with the result that this oil is burned and lost. Furthermore, pumping of oil also greatly increases the deposit of carbon in the combustion chamber and on the head of the piston. Pumping of oil is due principally to the suction created by the piston in the cylinder on its intake stroke, this being a down stroke of the piston in the cylinder with the intake valve open so that a carbureted mixture of fuel will be drawn into the cylinder and combustion chamber. The suction created on the upper side of the piston in the cylinder will cause suction past worn rings and a certain amount of the oil which lies below the rings between the piston skirt and the cylinder wall will be drawn up past the rings into the upper portion of the cylinder.

It is, therefore, an object of my invention to provide an internal combustion engine construction wherein the crank case of the engine is completely sealed except for a conduit connecting the crank case and the cylinder on the upper side of the piston to balance the pressure on the upper and lower sides of the piston to counteract the tendency of the piston to draw lubricant up past the piston rings particularly on the intake stroke of the piston.

Another object of the invention is the provision of a crank case which is completely sealed from the atmosphere to prevent the drawing of dust and grit into the crank case through the customarily used breather opening and at the same time permit what is commonly termed as breathing in the crank case.

A further object of the invention is the provision of a pressure compensating connection between the crank case and the upper portion of the cylinder wherein means is supplied for automatically closing off said connection when the lubricant inlet of the crank case is open for the addition of lubricating oil to prevent excessive supply of air to the combustion chamber when said inlet is open.

These and other objects and advantages of the invention will more fully appear from the following description made in connection with the accompanying drawing, wherein like reference characters refer to the same or similar parts throughout the views, and, in which.

Figure 1:
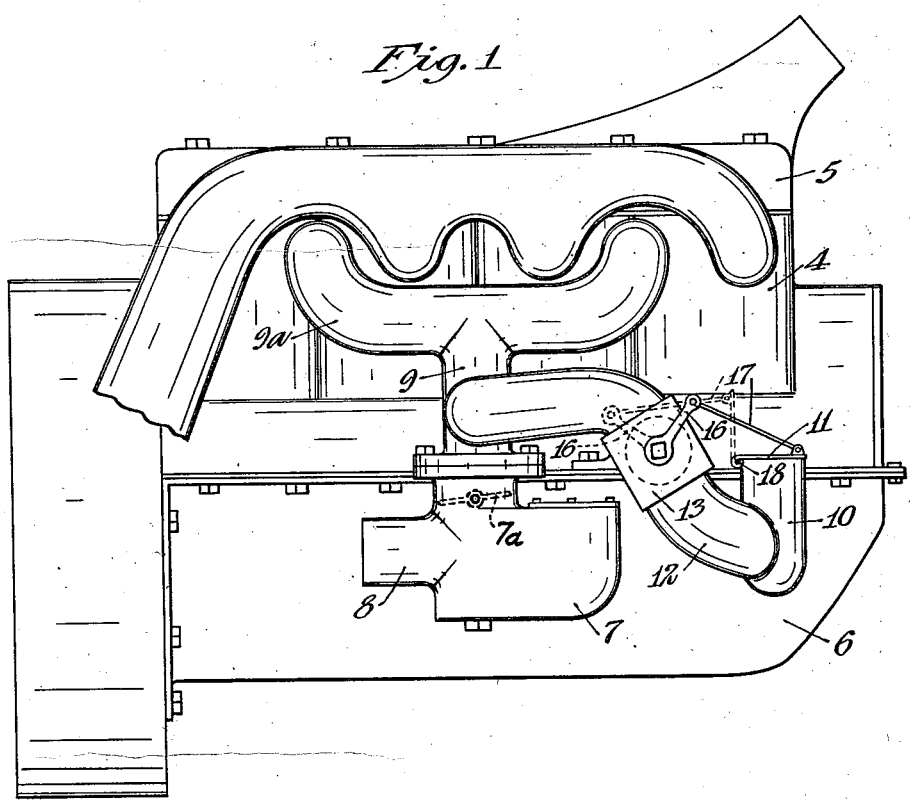
Fig. 1 is a more or less diagrammatic side elevation of an internal combustion engine constructed in accordance with my invention.

In Fig. 1 there is shown an engine with a cylinder block comprising cylinders 4 which are of conventional type with pistons reciprocating therein and with a cylinder head 5 enclosing the top of said cylinder block. A crank case 6 has the usual crank shaft therein connected to the pistons by means of connecting rods as is well understood in the art. A carburetor 7 is shown with the customary throttle valve 7a and air intake 8. Connected between the carburetor and the cylinders 4 is a fuel intake conduit 9 which cooperates with a manifold 9a to deliver fuel mixtures to the cylinders from the carburetor. A pipe or spout 10 is connected to the crank case to provide an inlet for the addition of lubricating oil to said crank case. The inlet spout is provided with a hinged cover 11 which seals said inlet from the atmosphere when the cover is closed. It is preferred that the cover be provided with a rubber or other suitable packing element to seal the mouth of the spout 10.

In order to carry out my invention it should be clearly understood that the entire crank case 6 is completely sealed from the atmosphere, and that there is no breather opening between the inside of the crank case and the atmosphere such as is usually found in internal combustion engines. Any other openings which might be present in an engine crank case are also completely sealed.

Connected between the fuel inlet pipe 9 and the lubricant inlet 10 or any other convenient point of connection with the interior of the crank case is a conduit 12 which is preferably of substantially the same internal diameter as the intake pipe 9. The conduit 12 must connect with the fuel inlet pipe 9 between the usual throttle valve and the engine intake valves. If the conduit 12 is connected to the lubricant inlet 10, said inlet should also be of an inner diameter substantially as great as the intake pipe 9. It will be noted that from its point of connection with the fuel inlet 9 the conduit 12 slopes upwardly slightly before leading down to where it connects with the crank case 6. The conduit 12 is thus arranged for the reason that should raw fuel condense in the intake manifold and run down the intake pipe 9 it will not follow the conduit 12 and run into the crank case and adulterate the lubricant in said crank case.

Figure 2:
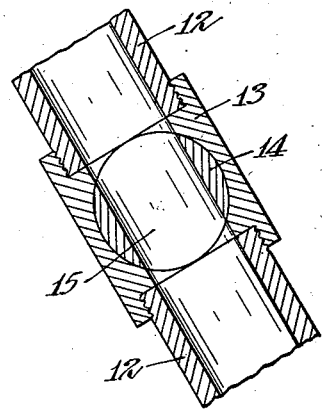
Fig. 2 is a fragmentary sectional view through a form of valve adapted for use with my invention.

When the engine is running each of the pistons is arranged to draw fuel mixture from the carburetor through the intake pipe and manifold and into the upper portion of the engine cylinders with the cylinder intake valve open. The suction created in the upper portion of the cylinder is considerable and if the piston packing rings are worn, the suction created in the cylinder above the piston will also cause suction to be exerted on the underside of the cylinder and in the crank case past said packing rings. The suction thus created past the rings causes the pumping of lubricant from the lower portions of the cylinder up past the pistons and their packing rings and into the upper portions of the cylinders above the pistons and into the combustion chamber. It is well known that this action results in rapid loss of lubricating oil which is not only burned up when the charge in the cylinder is fired, but also causes the rapid deposit of carbon in the combustion chamber and on the head of the piston. The conduit 12 eliminates the pumping of oil past the piston rings since suction created in the cylinder is naturally exerted in the intake manifold and intake pipe 9, and will also be exerted in the crank case because of the conduit 12 which connects the crank case to the fuel intake pipe. Thus it will be seen that pressures or negative pressures in the cylinders and in the crank case will be balanced and the oil will not be drawn up past the piston rings. It is, of course, preferred that the internal diameter of the conduit 12 be at least as great as that of the fuel intake pipe 9 so that the equalization of pressure to said conduit 12 will occur as quickly as the inner diameter of the intake pipe 9 will permit. If the lubricant inlet closure cap 11 should be opened for the addition of lubricant to the crank case while the engine is running, a considerable amount of excess air would be drawn in through the lubricant inlet pipe 10 and conduit 12 to the intake manifold and the cylinders on the intake strokes of the pistons, and this excess supply of air would, of course, stop the engine due to improper mixture of air and atomized fuel. For that reason I have provided a valve in the conduit 12 which as best shown in Fig. 2 includes a sleeve-like casing 13 which has rotatably mounted therein a core 14. It will be noted that the inner diameter of the sleeve 13 is the same as that of the conduit 12 and the aperture 15 in the core 14 is also of the same diameter. Thus the valve when in its open position in no way retards the balancing of pressure between the crank case and the cylinders. The valve core 14 is provided with an operating arm 16 and said arm is connected by a lever 17 to the lubricant inlet closure cap 11, the latter being hingedly mounted at 18. When the cap 11 is in closed position the valve lever 16 is in the full line position shown in Fig. 1, this being the open position of said valve. When the cap 11 is opened to the dotted line position shown in Fig. 1, the valve lever and core will be turned through an arc of 90° to close the conduit 12 between the intake 9 and the crank case. Thus the filler cap 11 can be opened for the addition of oil to the crank case while the motor is running and the conduit 12 will be simultaneously shut off so that the motor will continue running with its normal supply of air coming in through the carburetor air intake 8.

Figure 3:
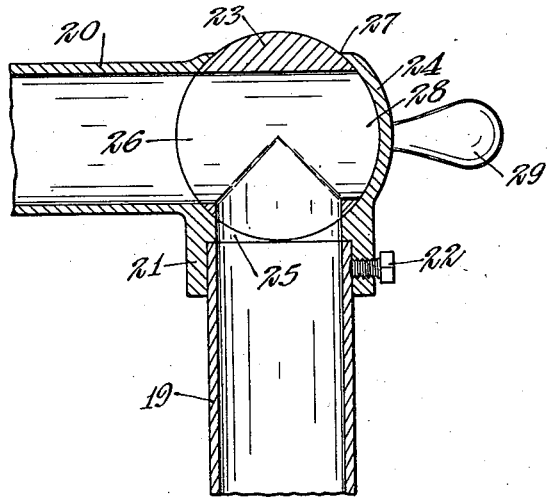
Fig. 3 is a sectional detail of a modified form of valve.

In Fig. 3 there is shown a modified form of valve in which the pipe 19 corresponds to the lubricant inlet pipe shown in Fig. 1 and the conduit 20 corresponds to the conduit 12 in Fig. 1. The conduit 20 may be provided with a sleeve-like connecting element 21 which fits down over the filler pipe 19 and which is held in position by a set screw 22. In the end of the conduit 20 is a valve core 23, said conduit end providing a valve casing portion 24 within which the core is rotatable. The core is provided with a port 25 and at right-angles thereto to the left in Fig. 3 a port 26 which permits communication between the oil inlet pipe 19 and conduit 20. In the position of the valve shown in Fig. 3 the upper portion of the core covers an opening 27 which leads to the atmosphere. A third port 28 in the valve core is disposed oppositely to the port 26, and when the core is rotated counterclockwise 90° by the valve operating handle 29, the port 28 will be in registry with the opening 27 in the valve casing, and port 26 will be in registry with the oil inlet pipe 19. Of course, in this position it will be seen that the portion of the core which had previously closed the opening 27 will have rotated 90° to close the conduit 20. In this position oil can be poured into the filler pipe 19 and thence into the crank case with communication between the crank case and the fuel intake cut off. It should also be noted that the conduit or valve casing portion which defines the opening 27 is provided with relatively sharp edges to clean off any dirt which might have accumulated on that portion of the valve core which is exposed to the air when the valve is rotated from the position shown in Fig. 3.

From the foregoing description it will be seen that I have provided an extremely simple variation of motor construction which will eliminate the pumping of oil past the piston rings of the engine and which will also eliminate the admission of dust and other foreign matter to the crank case for the reason that the crank case is completely sealed. In addition any fuel which is otherwise lost past the rings and drops into the oil in the crank case to thin said oil is immediately withdrawn from the crank case and re-introduced to the intake manifold of the engine. While the engine has been described as being used in connection with a completely sealed crank case and there would not appear to be any actual flow of air and gases from the crank case to the intake manifold, there naturally will be some gases forced down past the rings due to the high compression on the upper side of the piston during the compression, firing, and exhaust strokes of the piston. These gases which find their way down past the piston rings will be immediately withdrawn by the suction exerted in the crank case. Not only do fuel gases flow back into the intake manifold, but vaporized moisture which has condensed in the crank case will be withdrawn therefrom with the result that there will be no pool of water to collect in the lower part of the crank case. The amount of moisture present in the crank case will be reduced considerably due to the fact that there is no breather cap to permit the flow of moisture laden air into the crank case past said cap. While the breather cap such as is customarily used has been done away with, the crank case can still breath sufficiently to prevent the building of positive pressures therein because of the connection between the crank case and the fuel inlet, and this breathing of the crank case is not sufficient to noticeably affect proper supply of fuel to the cylinders. Furthermore, I have provided means for closing off the connection between the crank case and the fuel intake when the lubricant filler cap is opened for the introduction of oil to the crank case so that the engine can be kept running when said filler cap or valve is opened. The invention is such that it can be built into motors at the factory or can be quickly and easily applied to the present types of motors without affecting their operation.

It will, of course, be understood that various changes may be made in the form, details, arrangement and proportions of the various parts without departing from the scope of my invention.

What is claimed is:

1. In an internal combustion engine having a conventional cylinder, a piston adapted to reciprocate therein and a crank shaft connected to one side of said piston, a crank case adapted to enclose said crank shaft and sealed completely from the outer atmosphere, a carburetor, an intake conduit leading from said carburetor to the opposite side of said piston from said crank shaft, a lubricant inlet for said crank case, a pressure balancing conduit connected between said lubricant inlet and said intake conduit, said pressure balancing conduit being of sufficient diameter to permit substantially instantaneous balancing of differential pressures between opposite sides of said piston, a valve in said pressure balancing conduit, a hinged closure cap for said lubricant inlet, and a connection between said valve and said closure cap whereby said valve and said cap will move in unison and said closure cap being in closed position when said valve is in open position.

2. In an internal combustion engine having a conventional cylinder, a piston adapted to reciprocate therein and a crank shaft connected to one side of said piston, a crank case adapted to enclose said crank shaft and sealed completely from the outer atmosphere, a carburetor, an intake conduit leading from said carburetor to the opposite side of said piston from said crank shaft, a lubricant inlet pipe connected to said crank case, a pressure balancing conduit connected between said intake conduit and said lubricant inlet pipe, said pressure balancing conduit and said lubricant inlet pipe being of sufficient diameter to permit substantially instantaneous balancing of differential pressures between opposite sides of said piston, the connection between said pressure balancing conduit and said lubricant inlet pipe providing a valve casing, and a valve core rotatably mounted within said casing and having three ports therein, the first and second ports in said core being arranged in one position to connect the pressure balancing conduit and the lubricant inlet pipe, and one of said last mentioned ports and a third port being adapted to open said lubricant inlet pipe to the outer atmosphere, and a portion of said core being adapted to close either said pressure balancing conduit or said lubricant inlet pipe from the outer atmosphere in different positions of the core.

3. In an internal combustion engine, a crank case having its interior sealed from the outer atmosphere, a carburetor, a carbureted fuel intake conduit, a pressure balancing conduit connected between said crank case and said intake conduit, said crank case having a lubricant inlet, a closure for said lubricant inlet, means for closing said pressure balancing conduit, and means for simultaneously moving said conduit closing means and said lubricant inlet closure to cut off said conduit upon opening of said lubricant inlet closure.

DOUGLAS D. RAZE.